US009959888B2

(12) United States Patent
Gummadi et al.

(10) Patent No.: US 9,959,888 B2
(45) Date of Patent: May 1, 2018

(54) SYSTEM AND METHOD FOR DETECTION OF THE LOMBARD EFFECT

(71) Applicant: QUALCOMM Incorporated, San Diego, CA (US)

(72) Inventors: Bapineedu Chowdary Gummadi, Hyderabad (IN); Anurag Tiwari, Hardoi (IN); Hem Agnihotri, Varanasi (IN); Venkata A Naidu Babbadi, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/235,012

(22) Filed: Aug. 11, 2016

(65) Prior Publication Data

US 2018/0047417 A1 Feb. 15, 2018

(51) Int. Cl.
*G10L 21/00* (2013.01)
*G10L 25/90* (2013.01)
(Continued)

(52) U.S. Cl.
CPC ................ *G10L 25/90* (2013.01); *G08B 5/22* (2013.01); *G10L 25/87* (2013.01)

(58) Field of Classification Search
None
See application file for complete search history.

(56) References Cited

U.S. PATENT DOCUMENTS

| | | | | |
|---|---|---|---|---|
| 7,117,145 B1 * | 10/2006 | Venkatesh | ........... G10L 21/0208 | 704/200 |
| 7,171,003 B1 * | 1/2007 | Venkatesh | ................ H03G 3/32 | 381/66 |

(Continued)

FOREIGN PATENT DOCUMENTS

| | | |
|---|---|---|
| JP | H0627991 A | 2/1994 |
| WO | 2008075305 A1 | 6/2008 |
| WO | 2012160459 A1 | 11/2012 |

OTHER PUBLICATIONS

Paepcke A., et al., "Yelling in the Hall: Using Sidetone to Address a Problem with Mobile Remote Presence Systems," ACM Symposium on User Interface Software and Technology, Oct. 16-19, 2011, pp. 107-116.

(Continued)

*Primary Examiner* — Marcus T Riley
(74) *Attorney, Agent, or Firm* — Arent Fox, LLP

(57) ABSTRACT

A user wearing headphones (e.g., to listen to music, to engage in a voice call, etc.) may speak while receiving an audio signal through the headphones, which may cause the user to produce Lombard speech. Because the Lombard effect is generally involuntary, the user may be unaware that he or she is producing Lombard speech. The Lombard speech may inconvenience proximate individuals and/or embarrass the user (e.g., in an office, in an airport, etc.). An apparatus may be configured to receive, through a microphone communicatively coupled to the apparatus, an audio signal. The apparatus may be configured to determine whether the audio signal indicates speech by a user. The apparatus may be further configured to alert the user based on the determination that the audio signal indicates Lombard speech by the user.

27 Claims, 7 Drawing Sheets

(51) Int. Cl.
*G10L 25/87* (2013.01)
*G08B 5/22* (2006.01)

(56) References Cited

U.S. PATENT DOCUMENTS

| | | | | |
|---|---|---|---|---|
| 7,676,363 | B2 * | 3/2010 | Chengalvarayan | G10L 15/20 704/226 |
| 7,729,911 | B2 * | 6/2010 | Chengalvarayan | G10L 15/20 704/226 |
| 8,275,624 | B2 * | 9/2012 | Kehoe | G10L 21/0364 600/23 |
| 9,609,416 | B2 * | 3/2017 | Kaller | H04R 1/1041 |
| 2002/0194005 | A1 * | 12/2002 | Lahr | G10L 15/24 704/271 |
| 2003/0050786 | A1 * | 3/2003 | Jax | G10L 21/038 704/500 |
| 2003/0236672 | A1 * | 12/2003 | Aaron | G10L 15/01 704/277 |
| 2007/0073539 | A1 * | 3/2007 | Chengalvarayan | G10L 15/20 704/245 |
| 2008/0004875 | A1 * | 1/2008 | Chengalvarayan | G10L 15/20 704/234 |
| 2009/0316924 | A1 * | 12/2009 | Prakash | H04M 9/082 381/66 |
| 2010/0074434 | A1 * | 3/2010 | Kobayashi | H04M 9/082 379/406.08 |
| 2010/0100388 | A1 * | 4/2010 | Kehoe | G10L 21/0364 704/271 |
| 2012/0237047 | A1 * | 9/2012 | Neal | H04B 3/234 381/66 |
| 2012/0290297 | A1 * | 11/2012 | Baughman | G10L 17/22 704/233 |
| 2013/0230184 | A1 * | 9/2013 | Kuech | H04M 9/085 381/66 |
| 2015/0078573 | A1 * | 3/2015 | Nicholson | H04R 1/1041 381/74 |
| 2015/0358718 | A1 * | 12/2015 | Kaller | H04R 1/1041 381/56 |
| 2016/0171974 | A1 * | 6/2016 | Hannun | G10L 15/063 704/232 |
| 2017/0125038 | A1 * | 5/2017 | Hassani | G10L 25/87 |

OTHER PUBLICATIONS

Therrien A.S., et al., "Sensory Attenuation of SelfProduced Feedback: The Lombard Effect Revisited," PLoS ONE, 2012, vol. 7 (11), Retrieved from the internet URL: http://www.ncbi.nlm.nih.gov/pmc/articles/PMC3493519/, Retrieved dated on Apr. 18, 2016, 9 pages.

* cited by examiner

SYSTEM AND METHOD FOR DETECTION OF THE LOMBARD EFFECT

BACKGROUND

Field

The present disclosure relates generally to communication systems, and more particularly, to a detection of the Lombard effect in an audio signal.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

The Lombard effect is a phenomena in which a speaker involuntarily adjusts his or her vocal effort in response to another sound. The Lombard effect is often observed when the speaker is in a loud environment, such as in crowded areas in which many individuals are speaking or in areas that experience noise pollution. The Lombard effect refers not only to an increase in the volume of speech by a speaker, but also pitch, rate, inflection, annunciation, and other speech characteristics.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The Lombard effect is the involuntary tendency of a speaker to increase his or her vocal effort with the intention of improving audibility of his or her speech, especially when speaking in a loud-noise environment. Speech when the user is under the Lombard effect may be termed Lombard speech.

A user wearing headphones (e.g., to listen to music, to engage in a voice call, etc.) may speak while receiving an audio signal through the headphones, which may cause the user to produce Lombard speech. Because the Lombard effect may be involuntary, the user may be unaware that he or she is producing Lombard speech. The Lombard speech may inconvenience proximate individuals and/or embarrass the user (e.g., the user may loudly speak in an office or in an airport, etc.). With the increase in the use of headphones, an approach to mitigating Lombard speech may be beneficial.

In an aspect of the disclosure, a method, a computer-readable medium, and an apparatus are provided. The apparatus may be configured to receive, through a microphone communicatively coupled to the apparatus, an audio signal. The apparatus may be configured to determine whether the audio signal indicates speech by a user. The apparatus may be further configured to generate an alert based on the determination that the audio signal indicates Lombard speech by the user.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
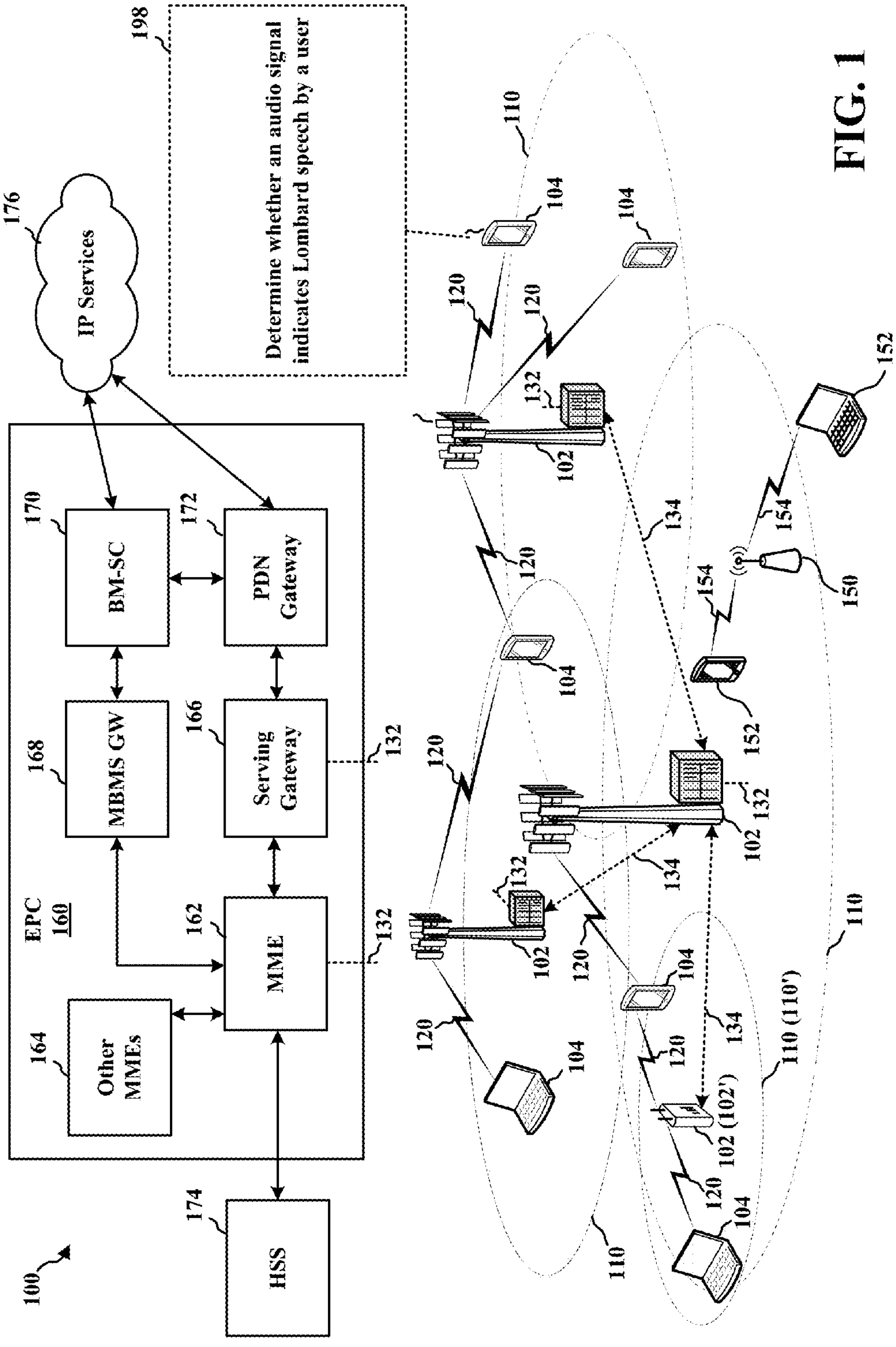
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to determine whether an audio signal received by the UE 104 indicates Lombard speech 198. The UE 104 may be configured to provide an alert to a user of the UE 104 based on the determination that the received audio signal indicates Lombard speech 198. For example, the UE 104 may be configured to extract one or more characteristics associated with the audio signal (e.g., phonetic fundamental frequencies, sound intensity, energy in one or more frequency bands, spectral tilt, durations of one or more words, volume, and the like) and determine whether the one or more characteristics indicates Lombard speech 198. In an aspect, the UE 104 may communicate with a base station 102 to determine whether the received audio signal indicates Lombard speech 198. The UE 104 may transmit an indication of the one or more characteristics associated with the audio signal to a base station 102, which may send the indication to a server. In response, the server may transmit, to the UE 104 through the base station 102, information indicating whether the audio signal received by the UE 104 indicates Lombard speech 198.

Figures 2A, 2B, 2C, 2D:
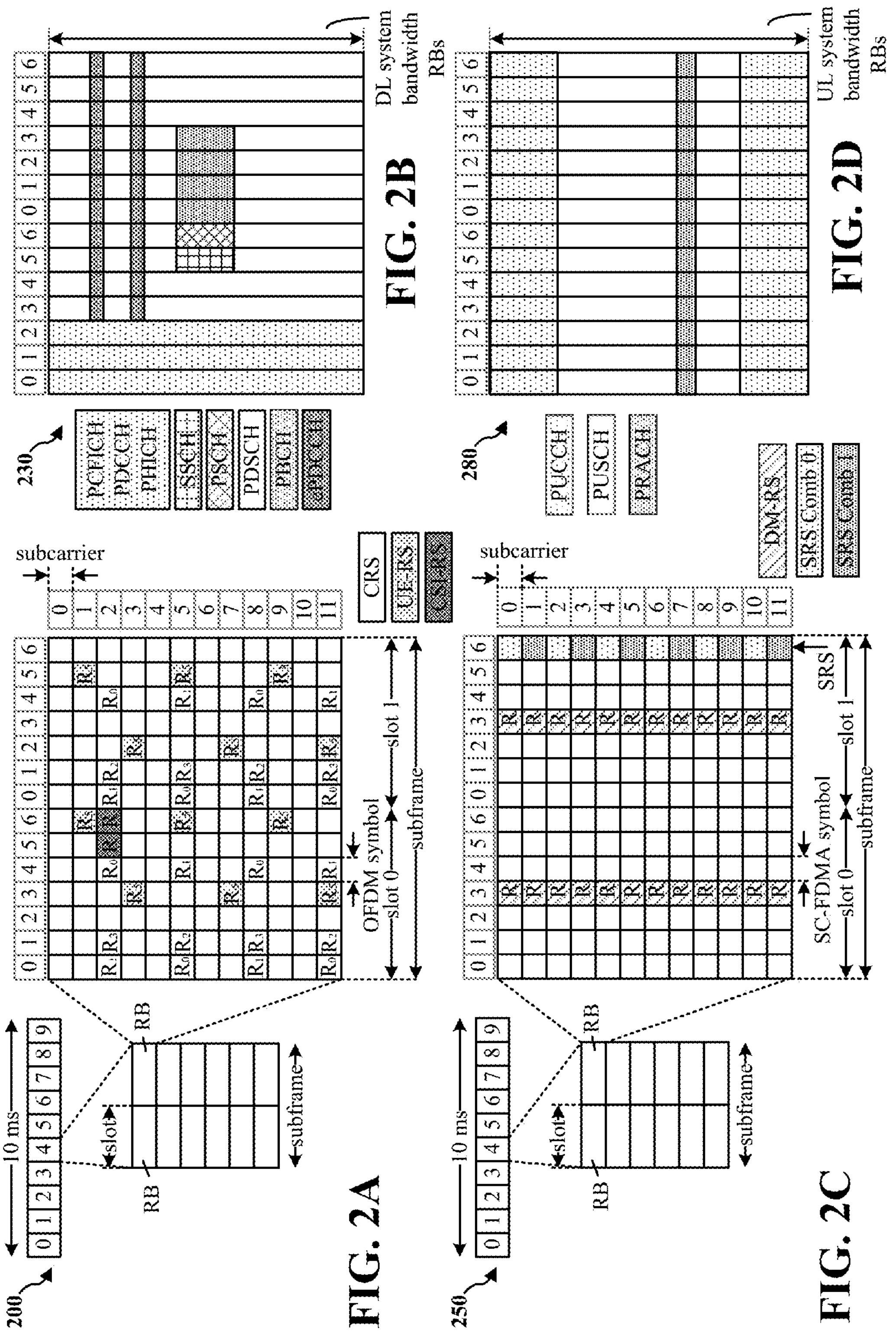
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
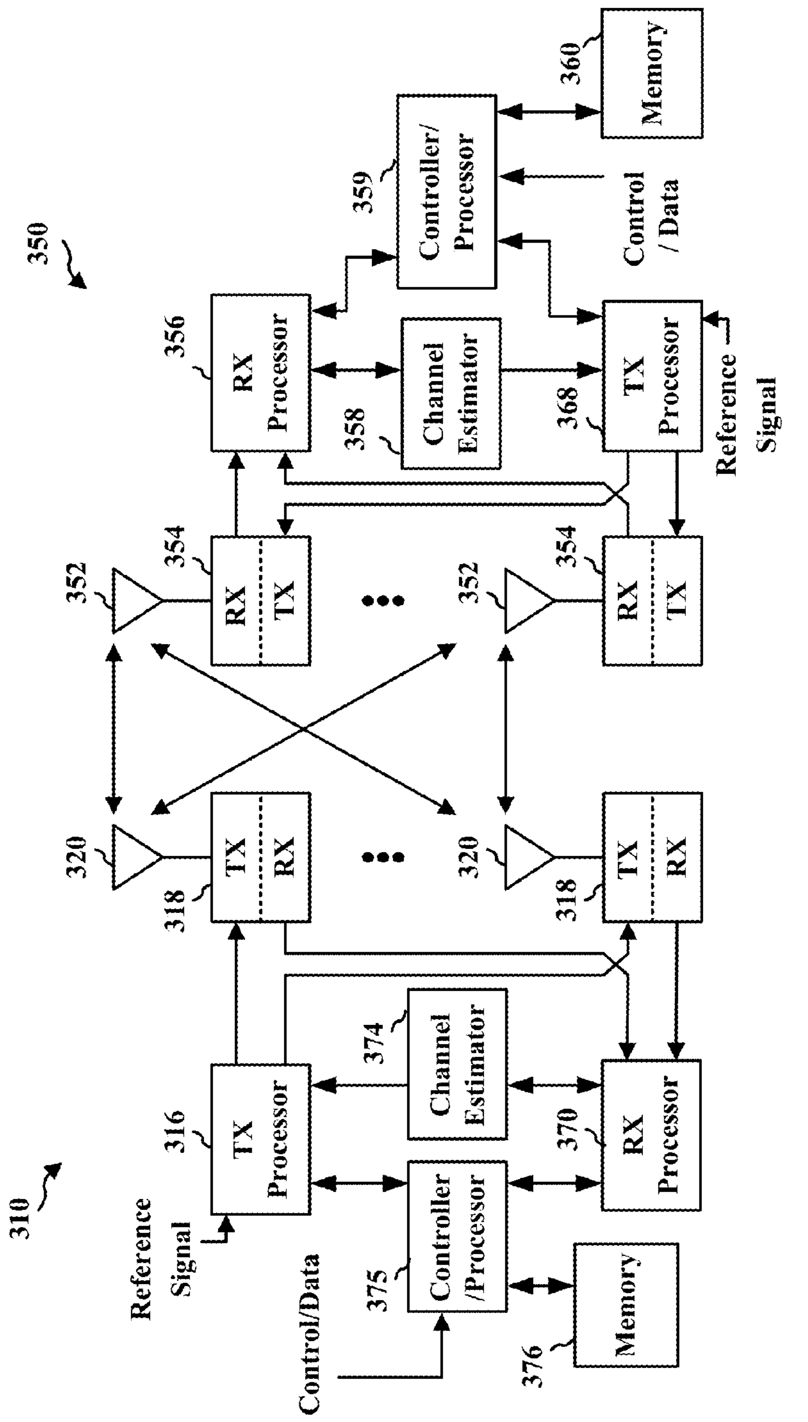
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

The Lombard effect is the involuntary tendency of a speaker to increase vocal effort with the intention of improving audibility of the speaker's speech, especially when speaking in a loud-noise environment. Speech when the user is under the Lombard effect may be termed Lombard speech.

A user wearing headphones (e.g., to listen to music, to engage in a voice call, etc.) may speak while receiving an audio signal through the headphones, which may cause the user to produce Lombard speech. Because Lombard speech may be involuntary, the user may be unaware that he or she is producing Lombard speech. The Lombard speech may inconvenience proximate individuals and/or embarrass the user (e.g., nearby individuals in an office, in an airport, etc.). Accordingly, a user may benefit from receiving an alert when the user is under the Lombard effect.

Figure 4:
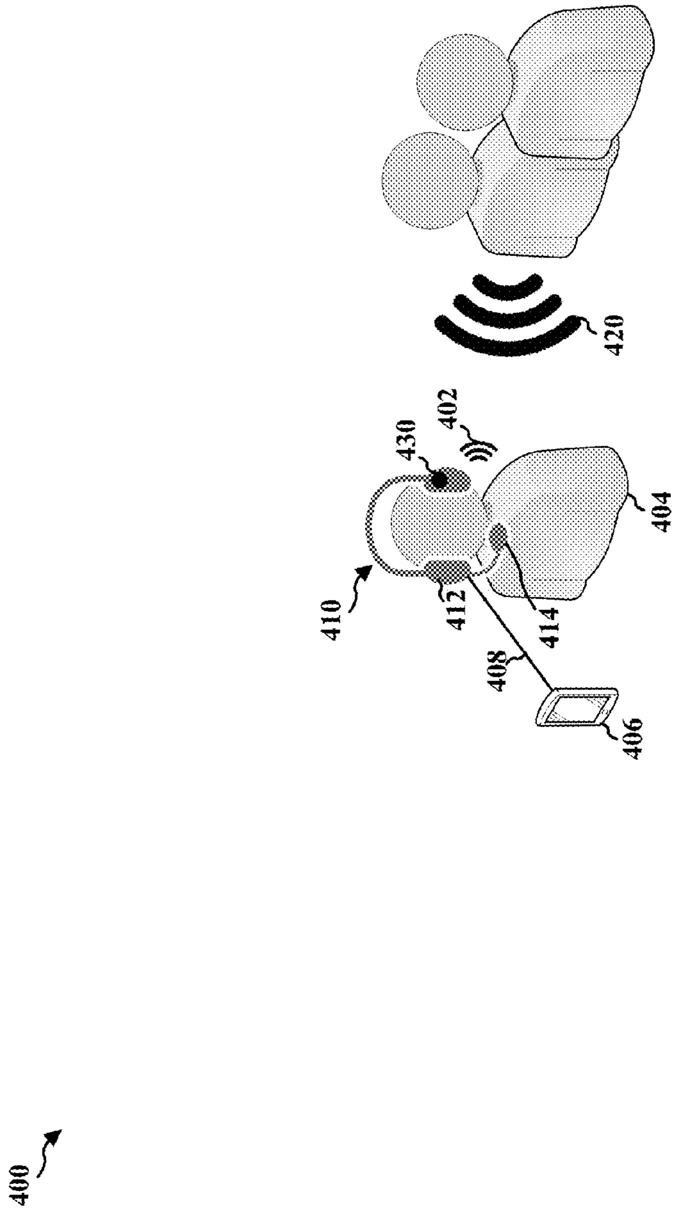
FIG. 4 is a diagram of an environment in which Lombard speech may be detected.

FIG. 4 is a diagram of an environment 400 in which Lombard speech 402 may be detected. In the environment 400, a user 404 may be wearing headphones 410. The headphones 410 may include at least one speaker 412 and at least one microphone 414. In an aspect, the headphones 410 may be communicatively coupled to a device 406 (e.g., a UE, a portable music player, and the like) through connection 408. The connection 408 may be any suitable connection capable of carrying an audio signal, including any wired or wireless connection, such as Bluetooth or an optical connection. The connection 408 allows the device 406 to send an audio signal to the headphones 410, which is output through the speaker 412. Similarly, the connection 408 allows the headphones 410 to send an audio signal to the device 406, such as an audio signal received through the microphone 414. While aspects described herein may be described in the context of headphones connected to a device, the present disclosure comprehends aspects in which various operations are performed by the headphones 410 (e.g., where the headphones 410 include processing circuitry configured to execute instructions to perform the operations described herein) and/or by the device 406 (e.g., where the microphone 414 is incorporated in the device 406).

In aspects, the user 404 may be speaking in the environment 400. Due to one or more factors in the environment, the user 404 may produce Lombard speech 402. The Lombard speech 402 may differ from normal speech by the user in one or more characteristics, generally intended to increase the audibility of the speech by the user. For example, the Lombard speech 402 may include a characteristic that reflects one or more of an increase in phonetic fundamental frequencies, a shift in energy from a lower frequency band to a middle and/or higher frequency band, an increase in sound intensity, an increase in vowel duration, a spectral tilt, a shift in formant center frequency for formant $F_1$ and/or formant $F_2$, a duration of one or more words (e.g., content words may be protracted more than function words), an increase in amplitude (e.g., volume), or another characteristic reflecting a variance from normal speech.

In an aspect, the microphone 414 may receive an audio signal that includes the Lombard speech 402. The microphone 414 may provide this audio signal to the device 406 through the connection 408. The device 406 may be configured to process the audio signal to detect the Lombard speech 402—that is, the device 406 may be configured to determine that the audio signal received through the microphone 414 indicates Lombard speech 402 by the user 404.

In an aspect, the device 406 may be configured to determine, from the audio signal, speech by the user 404. For example, the device 406 may be configured to isolate speech by the user 404 from the audio signal (e.g., using filtering) and/or constrain at least a portion of the audio signal to an amplitude and/or frequency range, for example, to prevent noise pollution from interfering with detection of the Lombard speech 402.

The device 406 may be configured to determine whether the audio signal indicates the Lombard speech 402 according to any suitable approach. In an aspect, the device 406 may be configured to analyze at least one characteristic of the audio signal and determine whether the at least one characteristic of the audio signal is indicative of the Lombard speech 402. For example, the device 406 may be configured to determine the amplitude of speech in the audio signal and determine whether that amplitude is indicative of the Lombard speech 402. In another example, the device 406 may be configured to analyze the audio signal to detect a decrease in a spectral tilt of speech in the audio signal (e.g., such that an amount of energy in a high frequency region of the vocal spectrum (e.g., greater than 500 hertz (Hz)) is greater than an amount of energy in a low frequency region of the vocal spectrum (e.g., less than 500 Hz).

In a third example, the device 406 may be configured to analyze the audio signal to detect an increase in pitch of a fundamental frequency and/or of the first formant $F_1$. The device 406 may be configured to detect a vowel spoken by the user 404 in the audio signal and detect the pitch associated with the vowel at the fundamental frequency or first formant $F_1$. The device 406 may determine therefrom whether the audio signal includes Lombard speech 402.

In a fourth example, the device 406 may be configured to analyze the audio signal to detect an increase in energy detected in a frequency band having a high noise energy. That is, the device 406 may be configured to determine that the audio signal from the microphone 414 includes, in addition to the speech by the user 404, external noise 420 (e.g., from other speakers or from another noise source). The external noise 420 may be present in one frequency band that also includes speech by the user 404. The device 406 may detect that the speech by the user 404 has a higher energy in the frequency band that also includes the external noise 420, and therefore may determine that Lombard speech 402 is present.

The device 406 may be configured to determine whether the at least one characteristic of the audio signal is indicative of the Lombard speech 402 according to one or more approaches. In one aspect, the device 406 may compare a value associated with the characteristic (e.g., an Hz value, a frequency peak, an amplitude, and the like) to a predetermined threshold. If the value exceeds the threshold, then the device 406 may determine the presence of the Lombard speech 402. In another aspect, the device 406 may compare the characteristic to a corresponding stored value. For example, the characteristic may include a waveform and the device 406 may compare the waveform to a stored waveform. If the characteristic waveform differs from the stored waveform (e.g., at least one peak of the characteristic waveform exceeds another peak of the stored waveform by a threshold amount), then the device 406 may determine the presence of Lombard speech 402. In various aspects, one or more predetermined thresholds and one or more stored values may be determined by the device 406 based on observation of the speech by the user 404. For example, the device 406 may store an average amplitude of the voice of the user 404 and/or the device 406 may store a waveform reflecting speech of the user 404 when the user is not under the Lombard effect (e.g., when there is no signal being output through the speaker 412 and/or when there is minimal external noise 420).

Because the user 404 may be unaware that he or she is producing Lombard speech 402 (e.g., because Lombard speech may be unintentional), the device 406 may be configured to provide an alert to the user 404 to indicate to the user 404 that he or she is under the Lombard effect. The user 404 therefore may choose to lower his or her voice, adjust his or her annunciations, and the like, for example, in order to mitigate disturbance to surrounding parties or to a far-end user of a connection (e.g., a person at the other end of a voice call).

In an aspect, the device 406 may provide an alert to the user 404 when the device 406 is causing another audio signal to be output through the speaker 412 of the headphones 410. The user 404 may be more likely to produce the Lombard speech 402 when hearing the other audio signal output through the speaker 412, e.g., because the user 404 is unaware of the characteristics of his or her voice in the surrounding environment 400. Thus, the device 406 may provide an alert to the user 404 when the speaker 412 is outputting the other audio signal—that is, the device 406 may determine that the speaker 412 of the headphones 410 is outputting the other audio signal, and alert the user 404 based on both the detected Lombard speech 402 and the determination that the speaker 412 is outputting the other audio signal.

Further, the device 406 may alert the user 404 when the user 404 is wearing the headphones 410 (e.g., in an aspect in which the alert is an audio alert, the device 406 may provide the alert only when the user 404 is wearing the headphones 410). According to one aspect, the device 406 may determine that the user is wearing the headphones 410. Accordingly, the device 406 may provide the alert to the user based on the detected Lombard speech 402 and the determination that the user 404 is wearing the headphones 410 (and, optionally, the determination that the speaker 412 is outputting the other audio signal). To determine that the user 404 is wearing the headphones 410, the headphones 410 may include a sensor 430 (e.g., a proximity sensor, a gyroscope, an inertia sensor) configured to output a signal (e.g., through connection 408). Based on the signal from the sensor 430, the device 406 may determine that the user 404 is wearing the headphones 410.

The alert provided by the device 406 may be any alert suitable to inform the user 404 that he or she under the Lombard effect. In an aspect, the device 406 may alert the user 404 by suspending the output of the other audio signal through the speaker 412 of the headphones 410. In another aspect, the device 406 may alert the user 404 by presenting a visual alert on a display of the device 406. In another aspect, the device 406 may alert the user 404 by causing a light associated with the headphones 410 and/or the device 406 to flash (e.g., a light-emitting diode (LED)) included in a housing of the device 406 or the headphones 410. In another aspect, the device 406 may alert the user 404 by causing the device 406 and/or the headphones 410 to vibrate.

In one aspect, the device 406 may alert the user 404 by playing back at least a portion of the audio signal received through the microphone 414 through the speaker 412. For example, the device 406 may buffer the received audio signal (e.g., when determining whether the received audio signal includes the Lombard speech 402) and, when the device 406 determines that the received audio signal includes the Lombard speech 402, the device 406 may play back at least a portion of the buffered audio through the speaker 412 of the headphones 410. In this way, the user 404 may be able to hear his or her own Lombard speech 402 and take corrective action to reduce Lombard speech.

In addition or alternative to the other audio signal output through the speaker 412, the user 404 may produce the Lombard speech 402 in response to the external noise 420. For example, the user 404 may be engaged in a voice call or video conference call and the external noise 420 may cause the user 404 to produce the Lombard speech 402. In this scenario, it may be undesirable to transmit the Lombard speech 402 to the far-end user of the call. Therefore, the device 406 may refrain from transmitting the Lombard speech 402 to the far-end user. In aspects, the device 406 may determine that the user 404 is engaged in a call. The device 406 may determine that the user 404 is producing Lombard speech 402 and, in response to this determination, the device 406 may suspend transmission of the audio signal of the call—that is, the microphone 414 may receive the audio signal and provide the audio signal to the device 406, which detects the Lombard speech 402, and the device 406 may suspend the transmission of the audio signal received through the microphone 414.

Figure 5:
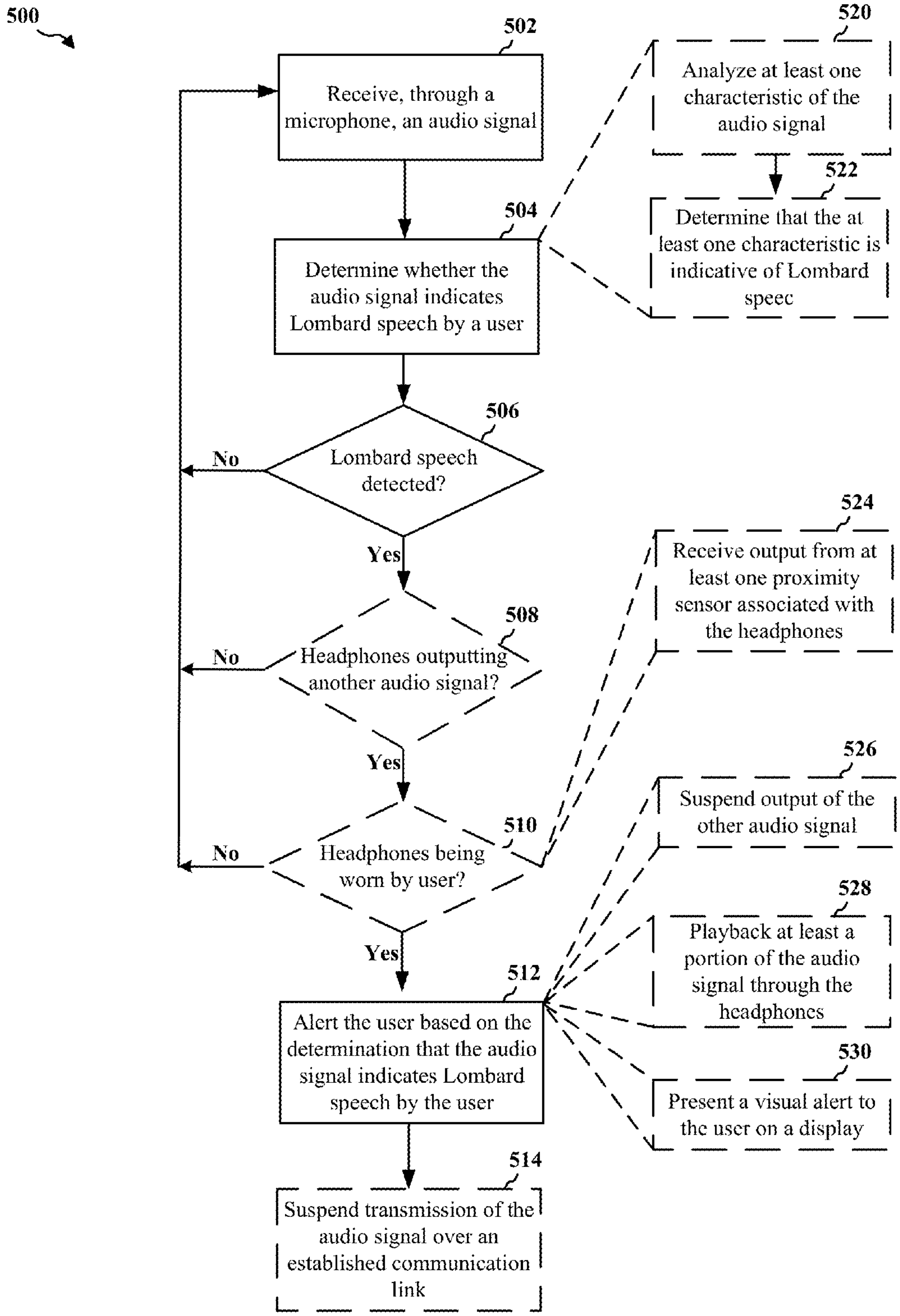
FIG. 5 is a flowchart of a method of processing an audio signal.

FIG. 5 is a flowchart of a method 500 of processing an audio signal. The method may be performed by a device (e.g., the device 406, the apparatus 602/602'). Although FIG. 5 illustrates a plurality of operations, one of ordinary skill will appreciate that one or more operations may be transposed and/or contemporaneously performed. Further, one or more operations of FIG. 5 may be optional (e.g., as denoted by dashed lines) and/or performed in connection with one or more other operations.

Beginning first with operation 502, the device may receive, through a microphone, an audio signal. In the context of FIG. 4, the device 406 may receive an audio signal through the microphone 414, and the audio signal may include the Lombard speech and/or the external noise 420.

At operation 504, the device may determine whether the audio signal indicates Lombard speech by the user. In the context of FIG. 4, the device 406 may determine whether the audio signal received through the microphone 414 indicates the Lombard speech 402 by the user 404.

In an aspect, operation 504 includes operation 520 and operation 522. At operation 520, the device may analyze at least one characteristic of the audio signal. For example, the device may analyze the received audio signal to determine the amplitude of speech in the audio signal (e.g., an increase in amplitude over time may indicate Lombard speech, an amplitude greater than a threshold may indicate Lombard speech). In another example, the device may analyze the audio signal to detect a decrease in a spectral tilt of speech in the audio signal, for example, such that an amount of energy in a high frequency region of the vocal spectrum (e.g., greater than 500 hertz (Hz)) is greater than an amount of energy in a low frequency region of the vocal spectrum (e.g., less than 500 Hz). In a third example, the device may analyze the audio signal to detect an increase in pitch of a fundamental frequency and/or of the first formant $F_1$. For example, an increase in pitch over time may indicate Lombard speech and/or a pitch greater than a threshold may indicate Lombard speech. In a fourth example, the device may analyze the audio signal to detect an increase in energy detected in a frequency band having a high noise energy (e.g., detected energy may increase over time, detected energy may be greater than a threshold, etc.). In the context of FIG. 4, the device 406 may be configured to analyze at least one characteristic of the audio signal received through the microphone 414.

At operation 522, the device may be configured to determine whether audio signal indicates Lombard speech by the user based on the analysis of the at least one characteristic. In one aspect, the device may compare a value associated with the characteristic (e.g., an Hz value, a frequency peak, an amplitude, and the like) to a predetermined threshold. If the value exceeds the threshold, then the device may determine the presence of the Lombard speech. In another aspect, the device may compare the characteristic to a corresponding stored value. For example, the characteristic may include a waveform and the device may compare the waveform to a stored waveform. If the characteristic waveform differs from the stored waveform (e.g., at least one peak of the characteristic waveform exceeds another peak of the stored waveform by a threshold amount), then the device may determine the presence of Lombard speech. In the context of FIG. 4, the device 406 may be configured to determine whether the audio signal indicates the Lombard speech 402 based on the analysis of the at least one characteristic of the audio signal received through the microphone 414.

If the audio signal does not indicate Lombard speech by the user, as illustrated at operation 506, the method 500 may return to operation 502. As described, the device may continue to receive an audio signal through a microphone that is communicatively coupled with the device. In the context of FIG. 4, the device 406 may continue to receive an audio signal through the microphone 414 to determine whether the audio signal indicates the Lombard speech 402.

If the audio signal does indicate Lombard speech by the user, as illustrated at operation 506, the method 500 may proceed to operation 508. At operation 508, the device may determine whether headphones communicatively coupled with the device are outputting an audio signal. The outputting of the audio signal by the headphones may imply that the user is more likely to produce Lombard speech (e.g., the device may detect a voltage driving the headphones or the device may determine that headphones are communicatively coupled with the device while an audio player of the device is playing an audio file. In various aspects, the device may determine whether headphones are connected to the device (e.g., by detecting a wireless connection with headphones or detecting that headphones are plugged into a port of the device). The device may determine that another audio signal is being output through the headphones, e.g., when the device is playing music or when the device is outputting voice audio through the headphones in association with a voice call or video call. In the context of FIG. 4, the device 406 may determine whether the headphones 410 are outputting another audio signal through the speaker 412.

If the device determines that the headphones are not outputting another audio signal, the method 500 may return to operation 502 or any of the aforementioned operations of the method 500. If the device determines that the headphones are outputting another audio signal, the method 500 may proceed to operation 510.

At operation 510, the device may determine whether the headphones are being worn by the user. In association with the output of the audio signal through the headphones, wearing of the headphones by the user may imply that the user is more likely to produce Lombard speech. In the context of FIG. 4, the device 406 may determine whether the headphones 410 are being worn by the user 404.

In an aspect, operation 510 includes operation 524. At operation 524, the device may receive a signal from a sensor communicatively coupled or otherwise associated with the headphones, such as a proximity sensor, accelerometer, gyroscope, or other sensor. From the sensor signal, the device may determine whether the user is wearing the headphones (e.g., a certain voltage from a sensor may indicate that the user is wearing the headphones). In the context of FIG. 4, the device 406 may receive a signal from the sensor 430 to determine whether the headphones 410 are being worn by the user 404.

If the device determines that the headphones are not being worn by the user, the method 500 may return to operation 502 or any of the aforementioned operations of the method 500. If the device determines that the headphones are being worn by the user, the method 500 may proceed to operation 512.

At operation 512, the device may alert the user based on the determination that the received audio signal indicates Lombard speech by the user. Because the Lombard effect is generally involuntary, the user may be unaware that he or she is producing Lombard speech, and thus provision of an alert to the user by the device may prevent embarrassment to the user and/or inconvenience to individuals proximate to the user. In the context of FIG. 4, the device 406 may provide an alert to the user 404.

In one aspect, operation 512 may include operation 526. At operation 526, the device may suspend output of another audio signal (e.g., the other audio signal being output through the headphones). Thus, the device may alert the user by suspending the output of another audio signal, for example, to decrease the involuntary tendency of the user to increase his or her vocal effort. In the context of FIG. 4, the device 406 may suspend output of another audio signal that is being output through the speaker 412 of the headphones 410.

In another aspect, operation 512 may include operation 528. At operation 528, the device may alert the user by playing back at least a portion of the audio signal received through the microphone. For example, the device 406 may buffer the received audio signal (e.g., when determining whether the received audio signal includes the Lombard speech) and, when the device determines that the received audio signal includes the Lombard speech, the device may play back at least a portion of the buffered audio through the speaker of the headphones. In the context of FIG. 4, the device 406 may play back at least a portion of the Lombard speech 402 received through the microphone 414.

In another aspect, operation 512 may include operation 530. At operation 530, the device may alert the user by presenting a visual alert on a display of the device. In the context of FIG. 4, the device 406 may alert the user 404 by presenting a visual alert on a display of the device 406.

In one aspect, the method 500 may include operation 514. At operation 514, the device may suspend transmission of an audio signal over an established communication link (e.g., when the user is engaged in a call). If Lombard speech is detected, it may be undesirable to transmit the Lombard speech to a far-end user of the call. Therefore, the device may suspend transmission of the audio signal (that may include Lombard speech) to the far-end user. In the context of FIG. 4, the device 406 may suspend transmission of an audio signal over an established communication link.

Figure 6:
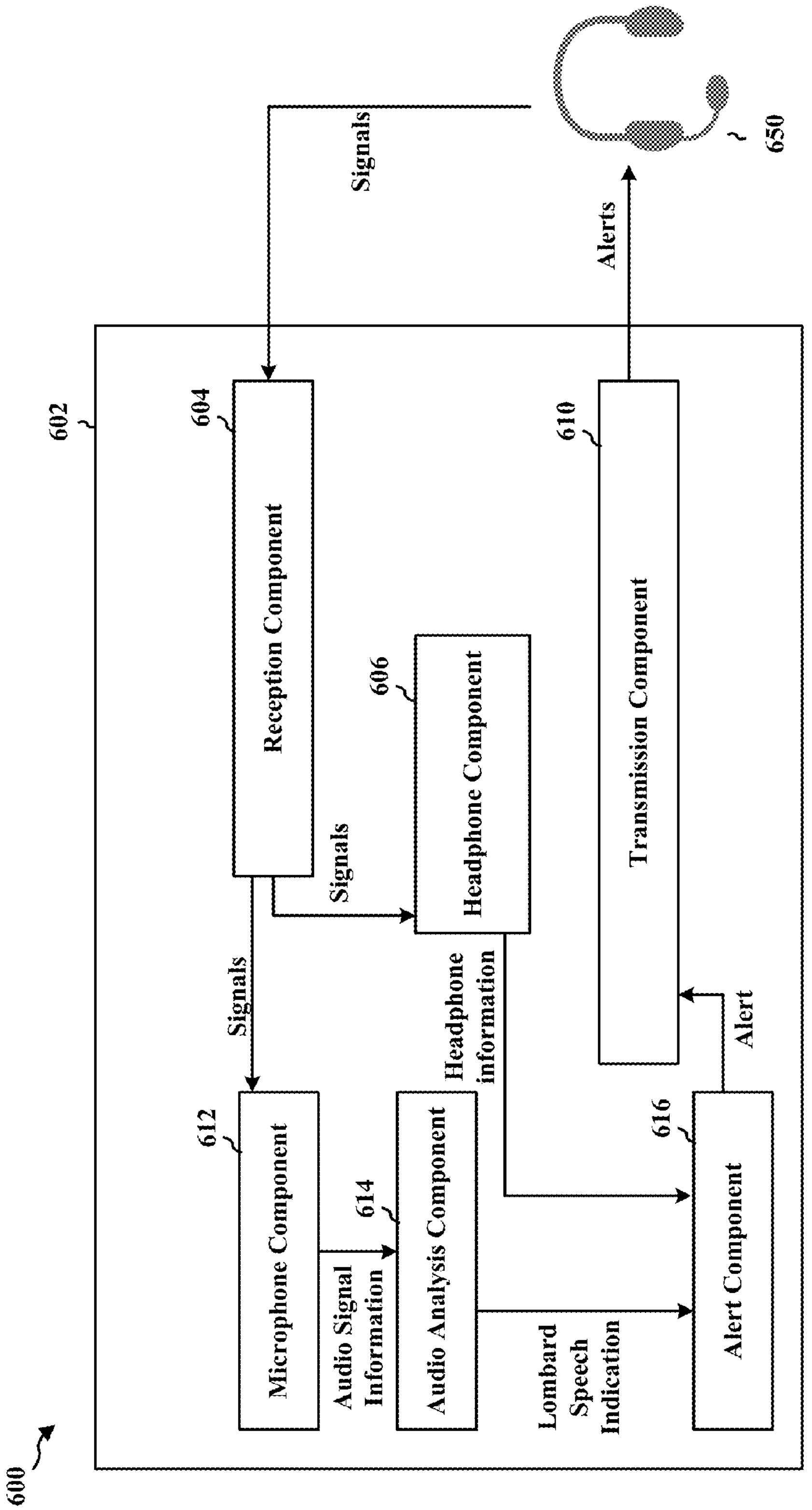
FIG. 6 is a conceptual data flow diagram illustrating the data flow between different means/components in an exemplary apparatus.

FIG. 6 is a conceptual data flow diagram 600 illustrating the data flow between different means/components in an exemplary apparatus 602. The apparatus 602 may be a device (e.g., the device 406, the UE 104). The apparatus 602 may be communicatively coupled with headphones 650 and the headphones 650 may include a microphone (e.g., the microphone 414). The apparatus includes a reception component 604 configured to receive signals (e.g., audio signals from a microphone) from apparatuses (e.g., the headphones 650) communicatively coupled with the apparatus 602. The apparatus 602 may further include a microphone component 612 configured to receive an audio signal from a microphone. For example, the microphone component 612 may include an analog-to-digital converter. The microphone component 612 may include other conversion means configured to convert an audio signal into another representation, such as a digital waveform, one or more amplitudes, a representation of spectral tilt, one or more energy values, and the like. The microphone component 612 may provide information about the received audio signal to an audio analysis component 614.

The audio analysis component 614 may be configured to determine whether the audio signal received through the microphone component indicates Lombard speech by a user. In an aspect, the audio analysis component 614 may be configured to analyze at least one characteristic of the audio signal information. For example, the audio analysis component 614 may analyze the received audio signal to determine the amplitude of speech in the audio signal. In another example, the audio analysis component 614 may analyze the audio signal to detect a decrease in a spectral tilt of speech in the audio signal (e.g., such that an amount of energy in a high frequency region of the vocal spectrum (e.g., greater than 500 hertz (Hz)) is greater than an amount of energy in a low frequency region of the vocal spectrum (e.g., less than 500 Hz). In a third example, the audio analysis component 614 may analyze the audio signal to detect an increase in pitch of a fundamental frequency and/or of the first formant $F_1$. In a fourth example, the audio analysis component 614 may analyze the audio signal to detect an increase in energy detected in a frequency band having a high noise energy. The audio analysis component 614 may be configured to determine whether audio signal indicates Lombard speech by the user based on the analysis of the at least one characteristic. In one aspect, the audio analysis component 614 may compare a value associated with the characteristic (e.g., an Hz value, a frequency peak, an amplitude, and the like) to a predetermined threshold. If the value exceeds the threshold, then the audio analysis component 614 may determine the presence of the Lombard speech. In another aspect, the audio analysis component 614 may compare the characteristic to a corresponding stored value. For example, the characteristic may include a waveform and the device may compare the waveform to a stored waveform. If the characteristic waveform differs from the stored waveform (e.g., at least one peak of the characteristic waveform exceeds another peak of the stored waveform by a threshold amount), then the audio analysis component 614 may determine the presence of Lombard speech.

If the audio analysis component 614 determines, from the audio signal information provided by the microphone component 612, that the audio signal indicates Lombard speech, the audio analysis component 614 may provide an indication to an alert component 616 that Lombard speech is detected. The alert component 616 may be configured to provide an alert to the user based on the indication that Lombard speech is detected, as received from the audio analysis component 614. In an aspect, the alert component 616 may be configured to provide an alert to the user by suspending output of another audio signal through the headphones 650. In another aspect, the alert component 616 may be configured to alert the user by playing back at least a portion of the audio signal received by the microphone component 612 through the headphones 650. In an aspect, the alert component 616 may be configured to alert the user by presenting a visual alert to the user on a display associated with the apparatus 602. In an aspect, the alert component 616 may be configured to suspend transmission of an outgoing audio signal, such as when a user is engaged in a call, to prevent Lombard speech from reaching the far-end user.

In an aspect, the apparatus 602 includes a headphone component 606. The alert component 616 may be configured to determine whether to provide an alert to the user based on information from the headphone component 606, in addition to the indication of Lombard speech received from the audio analysis component 614. In an aspect, the headphone component 60 may determine whether the headphones 650 are outputting an audio signal. The output of the audio signal may imply that the user is more likely to produce Lombard speech. In various aspects, the headphone component 606 may determine whether the headphones 650 are connected to the apparatus 602 (e.g., by detecting a wireless connection with the headphones 650 or detecting that the headphones 650 are plugged into a port of the device). The headphone component 606 may determine that another audio signal is being output through the headphones 650, such as when the apparatus 602 is playing music or when the apparatus 602 is outputting voice audio through the headphones 650 in association with a voice call or video call. The headphone component 606 may be configured to provide this information to the alert component 616, and the alert component 616 may provide the alert to the user when the headphone component 606 indicates that the headphones 650 are outputting an audio signal.

Further, the headphone component 606 may determine whether the headphones 650 are being worn by the user. In association with the output of the audio signal through the headphones, wearing of the headphones by the user may imply that the user is more likely to produce Lombard speech. The headphone component 606 may be configured to provide this information to the alert component 616, and the alert component 616 may provide the alert to the user when the headphone component 606 indicates that the headphones 650 are being worn by the user.

In an aspect, the headphone component may receive a signal from a sensor communicatively coupled or otherwise associated with the headphones 650, such as a proximity sensor, accelerometer, gyroscope, or other sensor. From the sensor signal, the headphone component 606 may determine whether the user is wearing the headphones 650 (e.g., a certain voltage from a sensor may indicate that the user is wearing the headphones). The headphone component 606 may be configured to provide this information to the alert component 616, and the alert component 616 may provide the alert to the user when the headphone component 606 indicates, based on a signal from a sensor, that the headphones 650 are being worn by the user.

The apparatus may include additional components that perform each of the blocks of the algorithm in the aforementioned flowcharts of FIG. 5. As such, each block in the aforementioned flowcharts of FIG. 5 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 7:
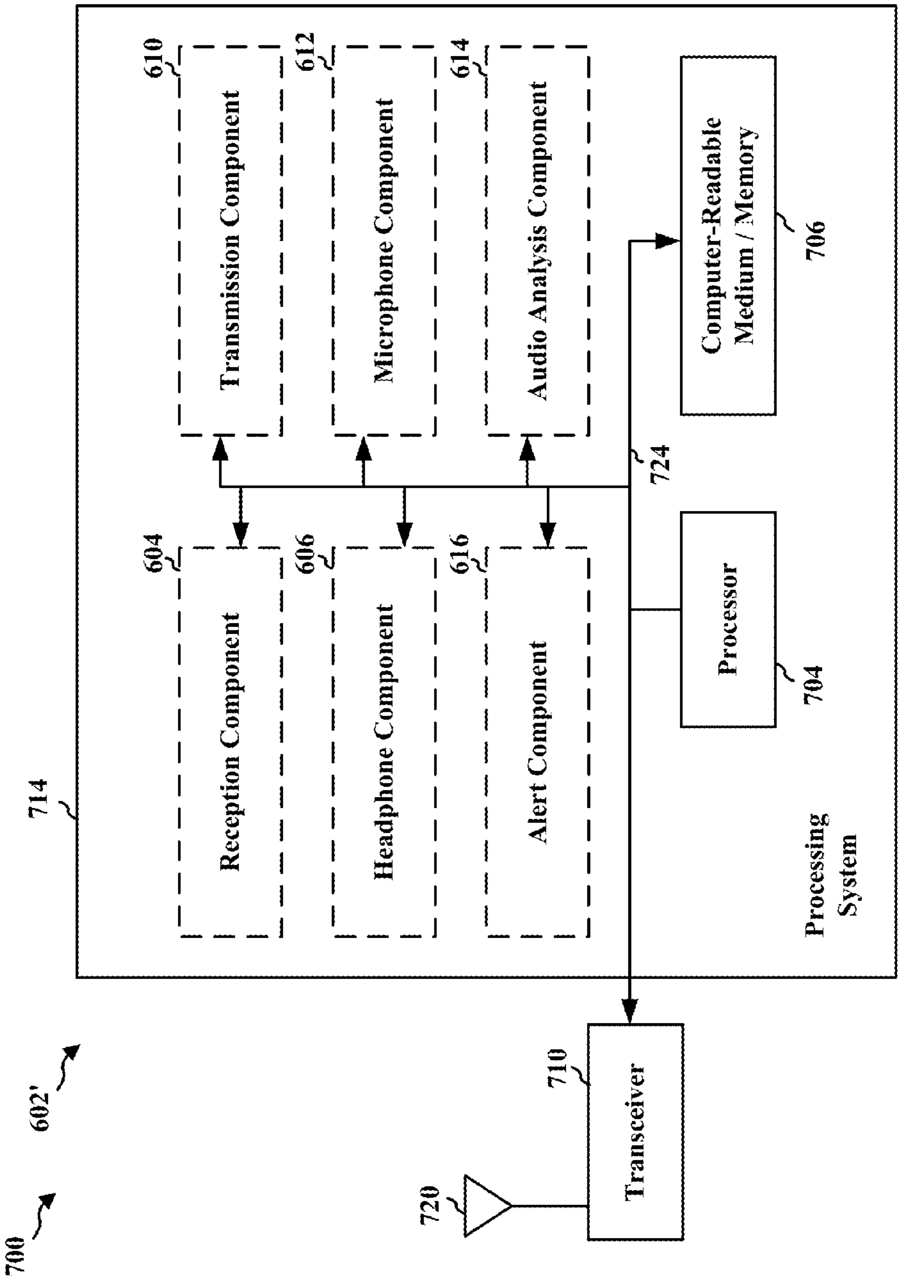
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware components, represented by the processor 704, the components 604, 606, 610, 612, 614, 616, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception component 604. In addition, the transceiver 710 receives information from the processing system 714, specifically the transmission component 610, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system 714 further includes at least one of the components 604, 606, 610, 612, 614, 616. The components may be software components running in the processor 704, resident/stored in the computer readable medium/memory 706, one or more hardware components coupled to the processor 704, or some combination thereof. The processing system 714 may be a component of the UE 350 and may include the memory 360 and/or at least one of the TX processor 368, the RX processor 356, and the controller/processor 359.

In one configuration, the apparatus 602/602' for wireless communication includes means for receiving, through a microphone connected to a device, an audio signal. The apparatus 602/602' further includes means for determining that the audio signal indicates Lombard speech by a user. The apparatus 602/602' further includes means for alerting the user based on the determination that the audio signal indicates Lombard speech by the user. The apparatus 602/602' may further include means for determining that the device is outputting another audio signal through headphones communicatively coupled to the device, wherein the alerting the user is further based on the determination that the device is outputting the other audio signal. In an aspect, the means for alerting the user is configured to suspend the output of the other audio signal through the headphones. In an aspect, the means for alerting the user is configured to play back at least a portion of the audio signal through the headphones.

In an aspect, the apparatus 602/602' may further include means for determining whether the headphones are being worn by the user, wherein the alerting the user is further based on a determination that the headphones are being worn by the user. In an aspect, the means for determining whether the headphones are being worn by the user is configured to receive output from at least one proximity sensor associated with the headphones and determine that the headphones are being worn by the user based on the output from the at least one proximity sensor. In an aspect, the means for determining that the audio signal indicates Lombard speech by the user is configured to analyze at least one characteristic of the audio signal and determine that the at least one characteristic is indicative of Lombard speech. In an aspect, the at least one characteristic includes an amplitude associated with speech of the user included in the audio signal. In an aspect, the analysis of the at least one characteristic of the audio signal includes detecting at least one of a decrease in a spectral tilt such that an amount of energy in a high frequency region of a vocal spectrum is greater than an amount of energy in a low frequency region of the vocal spectrum, an increase in pitch or a fundamental frequency and the first formant in at least one vowel detected in speech of the user included in the audio signal, or an increase of energy detected in a frequency band having a high noise energy. In an aspect, the means for alerting the user is configured to alert the user by presentation of a visual alert to the user on a display associated with the device. In an aspect, the apparatus 602/602' further includes means for suspending transmission of the audio signal over an established communication link.

The aforementioned means may be one or more of the aforementioned components of the apparatus 602 and/or the processing system 714 of the apparatus 602' configured to perform the functions recited by the aforementioned means. As described supra, the processing system 714 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of processing an audio signal by a device, the method comprising:

receiving, through a microphone communicatively coupled to a device, an audio signal;

determining that the audio signal indicates Lombard speech by a user;

determining that the device is outputting another audio signal through headphones communicatively coupled to the device, the another audio signal being a non-feedback signal; and generating an alert to alert the user regarding the Lombard speech, wherein the alert is based on the determination that the audio signal indicates Lombard speech by the user and based on the determination that the device is outputting the another audio signal.

2. The method of claim 1, wherein the generating the alert comprises:

suspending the outputting of the another audio signal through the headphones.

3. The method of claim 1, wherein the generating the alert comprises:

playing back at least a portion of the audio signal through the headphones.

4. The method of claim 1, further comprising:

determining whether the headphones are being worn by the user, wherein the generating the alert is further based on the determination that the headphones are being worn by the user.

5. The method of claim 4, wherein the determining whether the headphones are being worn by the user comprises:

receiving output from at least one proximity sensor associated with the headphones; and determining that the headphones are being worn by the user based on the output from the at least one proximity sensor.

6. The method of claim 1, wherein the determining that the audio signal indicates Lombard speech by the user comprises:

analyzing at least one characteristic of the audio signal; and determining that the at least one characteristic is indicative of Lombard speech.

7. The method of claim 6, wherein the at least one characteristic includes an amplitude associated with speech of the user included in the audio signal.

8. The method of claim 6, wherein the analyzing the at least one characteristic of the audio signal comprises:

detecting at least one of a decrease in a spectral tilt such that an amount of energy in a high frequency region of a vocal spectrum is greater than an amount of energy in a low frequency region of the vocal spectrum, an increase in pitch or a fundamental frequency and a first formant in at least one vowel detected in speech of the user included in the audio signal, or an increase of energy detected in a frequency band having a high noise energy.

9. The method of claim 1, wherein the generating the alert comprises:

presenting a visual alert on a display associated with the device.

10. The method of claim 1, further comprising:

suspending transmission of the audio signal over an established communication link.

11. An apparatus for wireless communication, comprising:

means for receiving, through a microphone communicatively coupled to the apparatus, an audio signal;

means for determining that the audio signal indicates Lombard speech by a user;

means for determining that the apparatus is outputting another audio signal through headphones communicatively coupled to the apparatus, the another audio signal being a non-feedback signal; and means for generating an alert to alert the user regarding the Lombard speech, wherein the alert is based on the determination that the audio signal indicates Lombard speech by the user and based on the determination that the apparatus is outputting the other audio signal.

12. The apparatus of claim 11, wherein the means for generating the alert is configured to suspend the output of the other audio signal through the headphones.

13. The apparatus of claim 11, wherein the means for generating the alert is configured to play back at least a portion of the audio signal through the headphones.

14. The apparatus of claim 11, further comprising:

means for determining whether the headphones are being worn by the user, wherein the generating the alert is further based on a determination that the headphones are being worn by the user.

15. The apparatus of claim 14, wherein the means for determining whether the headphones are being worn by the user is configured to:

receive output from at least one proximity sensor associated with the headphones; and determine that the headphones are being worn by the user based on the output from the at least one proximity sensor.

16. The apparatus of claim 11, wherein the means for determining that the audio signal indicates Lombard speech by the user is configured to:

analyze at least one characteristic of the audio signal; and determine that the at least one characteristic is indicative of Lombard speech.

17. The apparatus of claim 16, wherein the at least one characteristic includes an amplitude associated with speech of the user included in the audio signal.

18. The apparatus of claim 16, wherein the analysis of the at least one characteristic of the audio signal comprises:

detecting at least one of a decrease in a spectral tilt such that an amount of energy in a high frequency region of a vocal spectrum is greater than an amount of energy in a low frequency region of the vocal spectrum, an increase in pitch or a fundamental frequency and a first formant in at least one vowel detected in speech of the user included in the audio signal, or an increase of energy detected in a frequency band having a high noise energy.

19. The apparatus of claim 11, wherein the means for generating the alert is configured to alert the user by presentation of a visual alert to the user on a display associated with the apparatus.

20. The apparatus of claim 11, further comprising:

means for suspending transmission of the audio signal over an established communication link.

21. An apparatus for wireless communication, comprising:

a memory; and at least one processor coupled to the memory and configured to:

receive, through a microphone communicatively coupled to the apparatus, an audio signal;

determine that the audio signal indicates Lombard speech by a user;

determine that the apparatus is outputting another audio signal through headphones communicatively coupled to the apparatus, the another audio signal being a non-feedback signal; and generate an alert to alert the user regarding the Lombard speech, wherein the alert is based on the determination that the audio signal indicates Lombard speech by the user and based on the determination that the apparatus is outputting the other audio signal.

22. The apparatus of claim 21, wherein the at least one processor is configured to generate the alert by suspension of the output of the other audio signal through the headphones.

23. The apparatus of claim 21, wherein the at least one processor is configured to generate the alert by play back of at least a portion of the audio signal through the headphones.

24. The apparatus of claim 21, wherein the at least one processor is further configured to determine whether the headphones are being worn by the user, wherein the generation of the alert is further based on a determination that the headphones are being worn by the user.

25. The apparatus of claim 24, wherein the at least one processor is further configured to:

receive output from at least one proximity sensor associated with the headphones; and determine that the headphones are being worn by the user based on the output from the at least one proximity sensor.

26. The apparatus of claim 21, wherein the at least one processor is further configured to:

analyze at least one characteristic of the audio signal; and determine that the at least one characteristic is indicative of Lombard speech.

27. A non-transitory computer-readable medium storing computer-executable code for processing an audio signal, comprising code to:

receive, through a microphone communicatively coupled to an apparatus, an audio signal;

determine that the audio signal indicates Lombard speech by a user;

determine that the apparatus is outputting another audio signal through headphones communicatively coupled to the apparatus, the another audio signal being a non-feedback signal; and generate an alert to alert the user regarding the Lombard speech, wherein the alert is based on the determination that the audio signal indicates Lombard speech by the user and based on the determination that the apparatus is outputting the other audio signal.

* * * * *